Nov. 12, 1968  W. HAHN  3,410,174
HYDRAULIC BRAKE WITH COMPENSATION CHAMBER FOR GUN RECOIL
Filed Dec. 27, 1966

INVENTOR.
WILHELM HAHN
BY
Dicke & Craig
ATTORNEYS

United States Patent Office 3,410,174
Patented Nov. 12, 1968

3,410,174
HYDRAULIC BRAKE WITH COMPENSATION
CHAMBER FOR GUN RECOIL
Wilhelm Hahn, Dusseldorf, Germany, assignor to Rheinmetall G.m.b.H., Dusseldorf, Germany, a company of Germany
Filed Dec. 27, 1966, Ser. No. 604,698
Claims priority, application Germany, Dec. 30, 1965, R 42,344
7 Claims. (Cl. 89—43)

ABSTRACT OF THE DISCLOSURE

A hydraulic brake for gun recoil wherein a single uniform diameter cylinder is provided for both the brake piston and the temperature expansion compensation piston, with a control rod telescopically mounted within the brake piston and compensating piston being formed with a partition wall dividing the cylinder into the brake chamber and compensating chamber. The compensating piston is provided with an axially extending eccentric guide pin telescopically received within an end wall of the cylinder and provided with a pin radially extending through the cylinder to drive a pointer for indicating the position of the compensating piston.

Background of the invention

Such hydraulic brakes generally comprise a brake piston slidable over a stationary control rod. To compensate for the increase in volume of the brake fluid due to increase in temperature, it is known to provide a thermal expansion chamber in communication with the brake cylinder to enable the gun barrel to return satisfactorily into its end position during a long firing sequence resulting in relatively great heating and expansion of the brake fluid.

It has heretofore been proposed to provide a hydraulic brake in which a compensating cylinder is arranged coaxially with the brake cylinder. In this case, an extension of the brake cylinder rod projects in the manner of a plunger piston into the compensating cylinder, which is connected by way of a longitudinal bore of the piston rod to the brake cylinder chamber. However, this arrangement necessitates a hydraulic brake of great length and width, since the piston rod must be lengthened by the stroke and the compensating cylinder surrounding the end of the piston rod also takes up a corresponding space. For this reason, in many cases the compensating cylinder is arranged separately from the brake cylinder and the two cylinder chambers are connected by a pipe. Apart from the fact that such pipes and their connections are liable to failure as a result of the great shock forces on firing and the high pressure arising in modern guns, the compensating cylinder again requires additional space. However, the necessity of providing additional equipment is particularly undesirable in guns built into armoured vehicles, due to the restricted space available.

Summary of the invention

It is an object of the present invention to provide a hydraulic gun brake of simple and reliable construction comprising a brake piston slidable on a stationary control rod, in which a heat compensating chamber is arranged coaxially with the brake piston without substantially increasing the overall axial length.

In realizing this object of this invention, a partition is provided which is arranged on the stationary control rod and which divides the space enclosed by the cylindrical wall and the end walls of the hydraulic brake into a brake chamber and a compensating chamber, and a compensating piston is arranged slidably in the compensating chamber on the control rod.

Preferably, the compensating piston is guided by means of one or more bolts secured thereto in the outer end wall, the bolts forming at the same time an indicating device known per se for showing the position of the compensating piston. There is thus provided with very simple means an easily read indicating device which requires no additional space whatever.

Brief descripton of the drawing

Some of the objects and advantages of this invention having been stated, others will appear as the description proceeds when taken in connection with the accompanying drawing, in which—

Detailed description of the drawing

Figure 1:
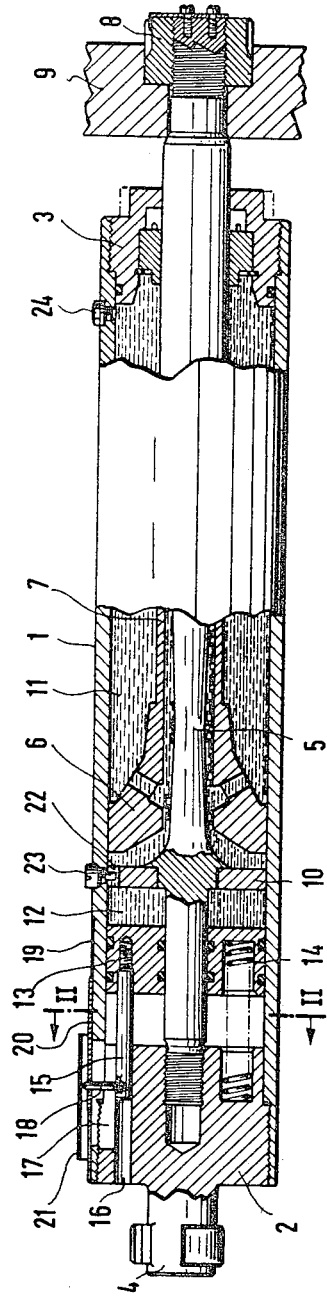
FIGURE 1 is a longitudinal section through a hydraulic brake according to this invention.
Figure 2:
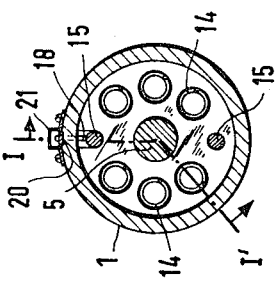
FIGURE 2 is a cross-section along the line II—II in FIGURE 1.
Figure 3:
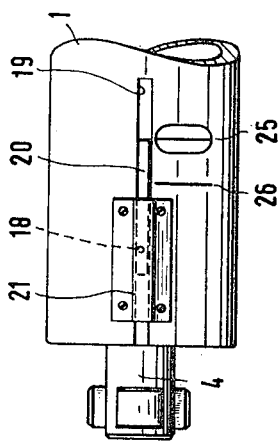
FIGURE 3 is a plan view of the indicating device.

Referring now more particularly to the drawing, the reference numeral 1 denotes the cylindrical wall of the hydraulic brake, which carries end walls 2 and 3. The end wall 2 is secured by means of an extension 4 to the gun cradle, which is not illustrated in the drawing. Said end wall serves at the same time for the mounting of the control rod 5 which is usual in such hydraulic brakes and passes through the entire cylinder chamber in the longitudinal axis. The brake piston 6 with the hollow piston rod 7 is guided slidably on the control rod 5, the piston rod projecting through the end wall 3 and being secured by means of a nut 8 to the breech 9 of the gun. The space enclosed by the cylinder wall 1 is divided into a brake chamber 11 and a compensating chamber 12 by a partition 10 arranged on the stationary control rod 5. The two chambers are interconnected by a small groove 22 which is provided at the periphery of the partition and the passage cross-section of which is adjustable by means of a throttle or adjusting screw 23. Provided in the compensating chamber is a compensating piston 13 arranged slidably on the control rod. The compensating piston bears on the end wall 2 by way of a plurality of helical springs 14 arranged in a circular arc and is guided by means of two bolts 15 in bores 16 provided in the end wall and corresponding in diameter to the bolt diameter. Since the longitudinal section of the hydraulic brake shown in FIG. 1 is cut to the left of the compensating chamber 12 along the line I–I' of FIG. 2, one helical spring 14 is visible in FIG. 1. Provided in the region of one bore 16 in the end wall 2 and in the cylinder wall 1 is a slot 17 through which projects a pin 18 fitted in the bolt 15, and a pointer 20 guided in a shallow longitudinal groove 19 of the cylinder wall is secured to said pin 18. To prevent foreign matter falling in through the slot, the latter is covered by a protective cap 21 and the length of the indicator is so dimensioned that the end of the latter extending beneath the cap gives a clearly visible indication of the position of the compensating piston 13 and thus of the degree of filling of the hydraulic brake at markings made on the cylinder wall, the mark 25 bearing the words "normal filling" and the mark 26 the words "cease firing."

After removing the filling screw 24 and the adjusting screw 23, the brake is filled with fluid; the brake chamber 11 is filled first and then, by way of the groove 22, the portion of the compensating chamber 12 between the partition 10 and the compensating piston 13. It is to be ensured that after filling the indicating device shows the correct degree of filling "normal filling." After replacing the screws 23 and 24, the brake is ready for operation.

When an increase in volume of the brake fluid takes place due to heating, the compensating piston 13 is displaced by the passage of brake fluid from the brake chamber through the groove 22 into the compensating chamber. When the maximum permissible operating temperature of the brake fluid is reached and thus the greatest volume, the indicating device points to the mark 26 bearing the words "cease firing." To avoid failure of the brake and the resulting breakdown in operation of the gun, firing must now be ceased for a time sufficient to allow the brake fluid to cool down enough to ensure trouble-free operation. This is very easily determined by observing the return of the indicating device to a position between the two markings 25 and 26, the compensating piston being displaced by the springs 14 towards its initial position as the brake fluid cools.

The throttle groove 22 provided in the partition 10 prevents the return and forward movements of the brake piston influencing the compensating piston and thus the indicating device.

In the drawing and specification there has been set forth a preferred embodiment of the invention and, although specific terms are employed, they are used in a generic and descriptive sense only and not for purposes of limitation, the scope of the invention being defined in the claims.

What is claimed is:

1. A hydraulic brake for gun recoil, comprising: a member having an inner cylindrical surface of a single uniform diameter with two opposite ends, end walls at the opposite ends of said tubular member, a compensating piston of the same diameter as said inner surface and being biased towards one end wall, together forming a sealed fluid containing chamber; a control rod extending axially of said cylindrical surface and having a partition wall mounted thereon dividing said chamber into a brake chamber immediately adjacent said one end and a compensating chamber between said compensating piston and said partition wall; piston rod extending through said one end wall, being hollow and opening toward the other of said end walls; said control rod extending from said partition wall toward said one end wall and being telescopically received within said hollow piston rod; a brake piston having through throttle openings, being mounted on the inside end of said piston rod and having a diameter substantially equal to said cylindrical surface diameter; the other end of said control rod being securely mounted to the other end wall; said compensating piston being annular and slidably mounted on said control rod between said other end wall and said partition wall.

2. The device of claim 1, including a bleed passage through said partition wall fluid connecting said compensating chamber and said brake chamber; a visible pointer on the exterior of said member; a radial opening in said member; means drivingly connected said pointer and said compensating piston for simultaneous corresponding axial movement relative to said member; indicia means between said pointer and said member indicating the relative position of said compensating piston.

3. The device of claim 2, including a protective cap radially outward of said pointed and covering said radial opening to prevent dirt from entering said member.

4. The device of claim 3, wherein said means drivingly connecting includes an axially extending pin rigidly eccentrically mounted on said compensating piston and telescopically guidingly received in said other end wall, a second pin radially extending through said opening and secured at one end to said first-mentioned pin and at its other end to said pointer.

5. A hydraulic brake for gun recoil, comprising: first piston and cylinder means forming therebetween a brake chamber; second piston and cylinder means forming therebetween a compensating chamber in throttle communication with said brake chamber; said second cylinder having an axially extending guide opening and said second piston having an axially extending eccentric guide rod on its side opposite the compensating chamber and telescopically received within said guide opening for preventing relative rotation between said second piston and cylinder means; said second cylinder means having a radially opening slot; a visible pointed mounted on the external surface of said second cylinder means for relative axial movement; said pointer being drivingly connected to said rod; and indicia means between said pointer and said second cylinder means indicating the relative position of said second piston means.

6. The device of claim 5, including a radially extending pin connected at one end to said rod and at its other end to said pointer forming said driving connection therebetween; a protective cap radially outward of said pointer covering said opening.

7. The device of claim 6, said second cylinder means having an axially extending recess slidably receiving therein said pointer.

References Cited
UNITED STATES PATENTS

| | | | |
|---|---|---|---|
| 522,508 | 7/1894 | Canet | 89—43 |
| 786,964 | 4/1905 | Emery | 89—43 X |
| 1,575,845 | 3/1926 | Joyce | 89—43 |

BENJAMIN A. BORCHELT, *Primary Examiner.*

S. C. BENTLEY, *Assistant Examiner.*

UNITED STATES PATENT OFFICE
CERTIFICATE OF CORRECTION

Patent No. 3,410,174

November 12, 1968

Wilhelm Hahn

It is certified that error appears in the above identified patent and that said Letters Patent are hereby corrected as shown below:

Column 4, lines 9 and 29, "pointed", each occurrence, should read -- pointer --.

Signed and sealed this 17th day of March 1970.

(SEAL)
Attest:

Edward M. Fletcher, Jr.
Attesting Officer

WILLIAM E. SCHUYLER, JR.
Commissioner of Patents